(12) United States Patent
Ikeda et al.

(10) Patent No.: US 7,328,083 B2
(45) Date of Patent: Feb. 5, 2008

(54) INJECTION MOLDING SYSTEM DATA MANAGEMENT METHOD

(75) Inventors: Yoshitaka Ikeda, Yamanashi (JP); Tetsuya Kosaka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 21 days.

(21) Appl. No.: 11/325,507

(22) Filed: Jan. 5, 2006

(65) Prior Publication Data

US 2006/0161291 A1 Jul. 20, 2006

(30) Foreign Application Priority Data

Jan. 14, 2005 (JP) .............................. 2005-007650

(51) Int. Cl.
*B29C 39/00* (2006.01)
*G06F 19/00* (2006.01)

(52) U.S. Cl. ........................ 700/197; 700/86; 700/200; 700/245

(58) Field of Classification Search .................. 700/86, 700/197, 200, 245
See application file for complete search history.

(56) References Cited

FOREIGN PATENT DOCUMENTS

EP 0 024 821 3/1981
EP 1 085 389 3/2001

OTHER PUBLICATIONS

European Search Report and Annex dated May 8, 2006 of Application No. EP 06 25 0094.
Partial English Translation of DE 103 18 694 (Reference AI on the IDS filed Aug. 4, 2006).

*Primary Examiner*—Leo Picard
*Assistant Examiner*—Sheela Rao
(74) *Attorney, Agent, or Firm*—Staas & Halsey LLP

(57) ABSTRACT

A controller of an injection molding machine and a controller of a molded-product removing robot are connected to each other via communication means. When a molding condition save command is entered from the controller of the injection molding machine, a folder with a management number is created on a memory card, and molding conditions stored in the controller of the injection molding machine are saved in the folder. A teaching program and/or setting data stored in the robot controller is read via the communication means and saved in the same folder. When a molding condition read command is entered, data is read from a specified folder, molding conditions are set in the controller of the injection molding machine, and a teaching program etc. are set in the robot controller via the communication means.

11 Claims, 2 Drawing Sheets

INJECTION MOLDING SYSTEM DATA MANAGEMENT METHOD

BACKGROUND OF THE INVENTION

1. Field of the Invention

The present invention relates to a data management method for an injection molding system including an injection molding machine and a molded-product removing robot that removes a product molded by the injection molding machine.

2. Description of the Related Art

One known type of injection molding system consists of an injection molding machine and a robot that removes, from a mold, a product molded by the injection molding machine. In this injection molding system, a mold matching the products to be molded is mounted on the injection molding machine, and molding conditions (clamping force, mold open position, injection speed, hold pressure, metering speed, metering position, etc.) for that mold are set in the injection molding machine. When brought into operation, the injection molding machine molds products by performing injection molding based on the molding conditions that have been set.

In each molding cycle, the molded-product removing robot removes a molded product when the mold is opened, but the robot movement for removing the molded product depends on the type of mold (on the mold structure). Different molded-product removing programs must be taught to the robot according to the product to be molded. In some cases, different molds used in the injection molding machine have the same settings, but it is still necessary to teach the robot a different program for each mold; in other cases, the same robot teaching program (robot movement pattern) is used for different molds, but the different molds require different position settings or auxiliary movement settings; in still other cases, it is necessary both to teach the robot a separate program and set separate data for each mold.

In a conventional injection molding system having an injection molding machine and molded-product removing robot, whenever the mold is changed, a set of molding conditions is read or saved through the controller of the injection molding machine, and a different program and/or setting data is read or saved through the controller of the molded-product removing robot.

A set of molding conditions for a mold is paired with the teaching program and/or setting data for a robot. Thus, once a mold is selected, the molding conditions and the program and/or setting data for the molded-product removing robot are determined. If a set of molding conditions or a robot teaching program not matching the mold is set by mistake, the system will not operate. To avoid such mistakes, a conventional practice is to store the molding conditions and robot teaching program etc. in separate files to which corresponding file names, such as the mold number, are assigned. The molding conditions and the robot teaching program and/or setting data matching the mold can then be set correctly in the controller of the injection molding machine and robot controller.

In the conventional injection molding system consisting of an injection molding machine and a molded-product removing robot, each time the molding conditions and robot teaching program and/or setting data are saved or read, two saving or reading procedures are required: one performed on the control panel of the controller of the injection molding machine, and another performed on the control panel of the controller of the molded-product removing robot.

As the molding conditions for a mold are to be paired with the corresponding robot teaching program and/or setting data as described above, they must be set in the injection molding machine and molded-product removing robot separately. However, the set of molding conditions and the robot teaching program and/or setting data are stored in separate files, so even if the files are managed by mold numbers or the like, an error made in specifying corresponding numbers or an error in a file reading operation can produce a mismatch between the molding conditions and the robot teaching program and/or setting data.

SUMMARY OF THE INVENTION

The present invention relates to a data management method for an injection molding system in which a controller of an injection molding machine and a controller of a molded-product removing robot that removes a product molded by the injection molding machine are connected by a communication means.

A first embodiment of the data management method according to the present invention comprises a step transferring, when an operation for saving the set of molding conditions is performed through an operation means on the injection molding machine side, a teaching program and/or setting data for the molded-product removing robot which correspond to the set of molding conditions, to the controller of the injection molding machine via the communication means, and step of saving the set of molding conditions for the injection molding machine and the teaching program and/or setting data for the molded-product removing robot in association with each other in a storage means.

A second embodiment of the data management method according to the present invention comprises a step of storing a set of molding conditions for use in the injection molding machine and a teaching program and/or setting data for use in the molded-product removing robot in a storage means in association with each other, a step of reading from the storage means, when an operation for reading the desired set of molding conditions is performed through an operation means on the injection molding machine, a desired set of molding conditions and a teaching program and/or setting data stored in association with the desired set of molding conditions, and a step of setting the read program and/or setting data in the controller of the molded-product removing robot via the communication means.

A third embodiment of the data management method according to the present invention comprises a step of transferring, when an operation for saving the teaching program and/or setting data is performed through an operation means on the molded-product removing robot, a set of molding conditions for the injection molding machine which correspond to the teaching program and/or setting data, to the controller of the molded-product removing robot via the communication means, and a step of saving the teaching program and/or setting data for the molded-product removing robot and the set of molding conditions for the injection molding machine in association with each other in a storage means.

A fourth embodiment of the data management method according to the present invention comprises a step of storing a teaching program and/or setting data for use in the molded-product removing robot and a set of molding conditions for use in the injection molding machine in association with each other in a storage means, a step of reading from the storage means, when an operation for reading the desired teaching program and/or setting data is performed through an operation means on the molded-product removing robot, a desired teaching program and/or setting data and a set of molding conditions stored in association with the desired teaching program and/or setting data, and a step of setting the read set of molding conditions in the controller of the injection molding machine via the communication means.

A fifth embodiment of the data management method according to the present invention comprises a step of providing the controller of the injection molding machine or the controller of the molded-product removing robot with a storage means for storing a set of molding conditions for use in the injection molding machine and a teaching program and/or setting data for use in the molded-product removing robot in association with each other, and a step of transferring to the controller provided with said storage means from the controller not provided with the storage means via the communication means, when an operation for saving a set of molding conditions or an operation for saving a teaching program and/or setting data is performed through an operation means on the injection molding machine or an operation means on the molded-product removing robot, the set of molding conditions or the teaching program and/or setting data, and saving in the storage means the teaching program and/or setting data and the set of molding conditions in association with each other.

A sixth embodiment of the data management method according to the present invention comprises a step of providing the controller of the injection molding machine with a storage means for storing a set of molding conditions for use in the injection molding machine and a teaching program and/or setting data for use in the molded-product removing robot in association with each other, and a step of reading, by the controller of the injection molding machine, when an operation for reading a set of molding conditions or an operation for reading a teaching program and/or setting data is performed through an operation means on the injection molding machine or an operation means on the molded-product removing robot, the set of molding conditions and its associated teaching program and/or setting data from said storage means, and setting the read molding conditions, and then transferring the teaching program and/or setting data for the molded-product removing robot to the controller of the molded-product removing robot via the communication means.

A seventh embodiment of the data management method according to the present invention comprises a step of providing the controller of the molded-product removing robot with a storage means for storing a set of molding conditions for use in the injection molding machine and a teaching program and/or setting data for use in the molded-product removing robot in association with each other, and a step of reading, by the molded-product removing robot, when an operation for reading a set of molding conditions or an operation for reading a teaching program and/or setting data is performed through an operation means on the injection molding machine or an operation means on the molded-product removing robot, the set of molding conditions and its associated teaching program and/or setting data from the storage means, and setting the read program and/or setting data, and then transferring the set of molding conditions to the controller of the injection molding machine via the communication means.

As the data management method for injection molding systems according to the present invention comprises the above steps, a set of molding conditions and its related robot teaching program and/or setting data can be saved in association with each other and easily read, thereby preventing occurrence of a discrepancy between the set of molding conditions and the robot teaching program and/or setting data resulting from an operation error.

DETAILED DESCRIPTION OF THE PREFERRED EMBODIMENTS

Figure 1:
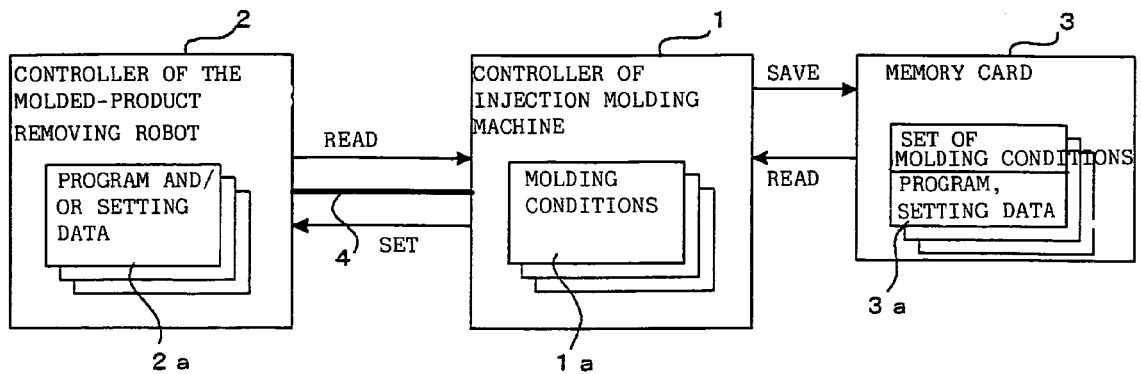
FIG. 1 is a schematic block diagram of an injection molding system executing one example of the data management method of the present invention.

FIG. 1 is a schematic block diagram of an injection molding system executing one example of the data management method of the present invention. In the injection molding system shown in FIG. 1, the controller 1 of an injection molding machine and the controller 2 of a molded-product removing robot are connected via communication means 4 such as an Ethernet (registered trademark) network. The controller 1 of the injection molding machine is provided with a memory card interface, through which a memory card 3 (storage means) for storing molding conditions, programs, and setting data is connected to the controller.

To mold a product, the controller 1 of the injection molding machine controls the driving of the injection molding machine based on a set of molding conditions 1a which is stored. To remove the molded product from the mold, the controller 2 of the molded-product removing robot controls the driving of the robot based on a robot teaching program and/or setting data 2a which is stored.

After a new mold is mounted on the injection molding machine, a process is performed to obtain molding conditions for production of conforming molded products. Then the program and/or setting data 2a for the robot that removes the molded products is taught and/or set. The set of molding conditions 1a and robot teaching program and/or setting data 2a can then be saved together in the memory card 3 (storage means).

If the molding conditions 1a and robot teaching program and/or setting data 2a matching the mold to be used have already been stored in the memory card 3, the molding conditions 1a and its associated robot teaching program and/or setting data 2a can be read together from the memory card 3 and set in the controller 1 of the injection molding machine and the controller 2 of the molded-product removing robot before the mold is used.

Figure 2:
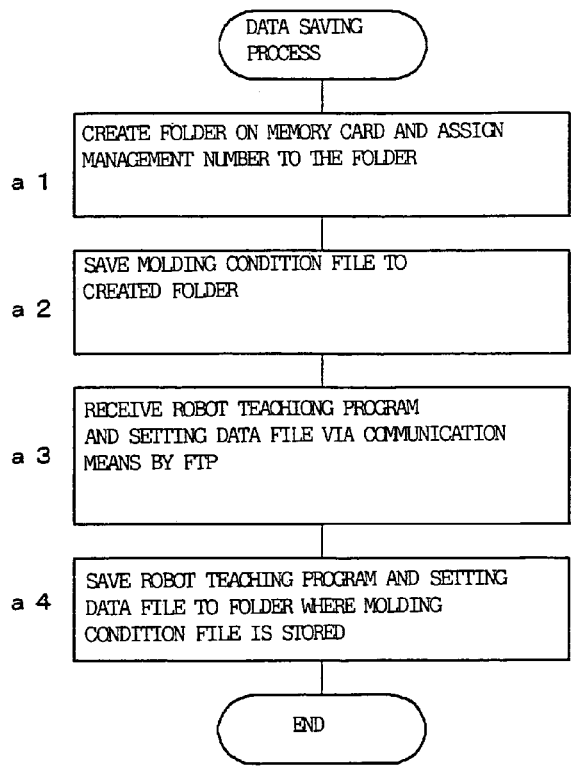
FIG. 2 is a flowchart illustrating the data saving process performed by the controller of the injection molding machine in the injection molding system shown in FIG. 1.

FIG. 2 is a flowchart illustrating the process of saving the set of molding conditions 1a and the robot teaching program and/or setting data 2a, which are executed by the controller of the injection molding machine in the injection molding system shown in FIG. 1.

When a molding condition save command is entered from the control panel on the controller 1 of the injection molding machine, the processor in the controller 1 of the injection molding machine initiates the process shown in FIG. 2, by first creating a folder 3a on the memory card 3 and assigning a management number to the folder 3*a* (step a1). Then, the file including the set of molding conditions 1*a* created and stored in the controller 1 of the injection molding machine is saved in the newly created folder 3*a* (step a2).

The controller 1 of the injection molding machine receives a robot teaching program and setting data file from the controller 2 of the molded-product removing robot via Ethernet network 4 by using the File Transfer Protocol (FTP) (step a3), and saves the teaching program and setting data file in the folder 3*a*, described above, that contains the molding condition file (step a4), thereby completing the data saving process.

In this way, a set of molding conditions 1*a* and the associated robot teaching program and/or setting data 2*a* is saved and stored in the same folder 3*a* on the memory card 3 based on the molding condition save command.

Figure 3:
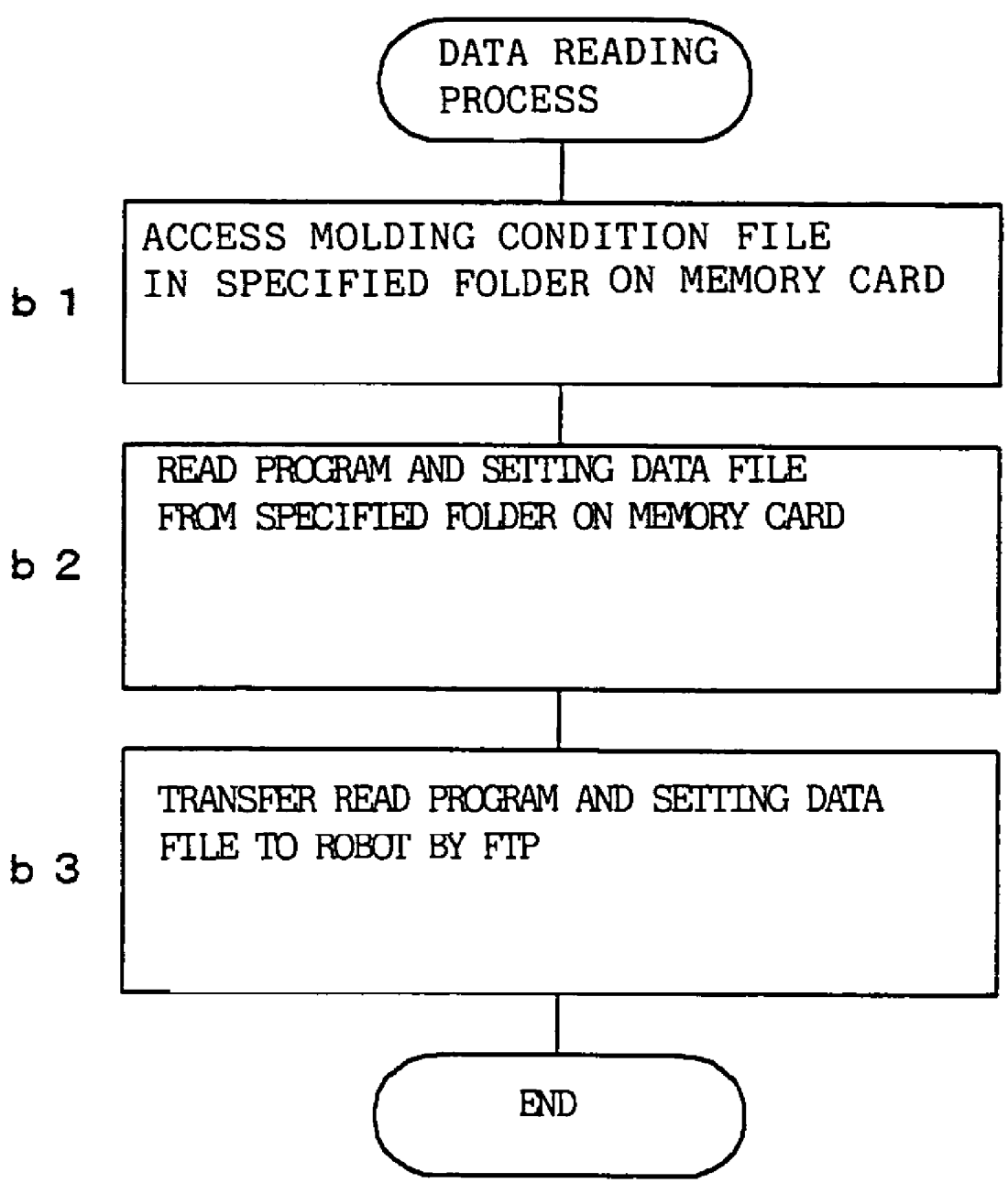
FIG. 3 is a flowchart illustrating the data reading process performed by the controller of the injection molding machine in the injection molding system shown in FIG. 1.
Figure 1:
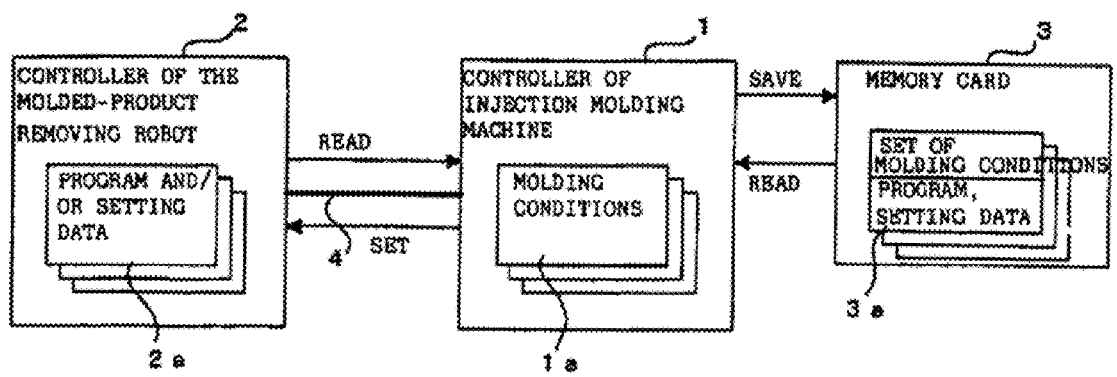
Figure 2:
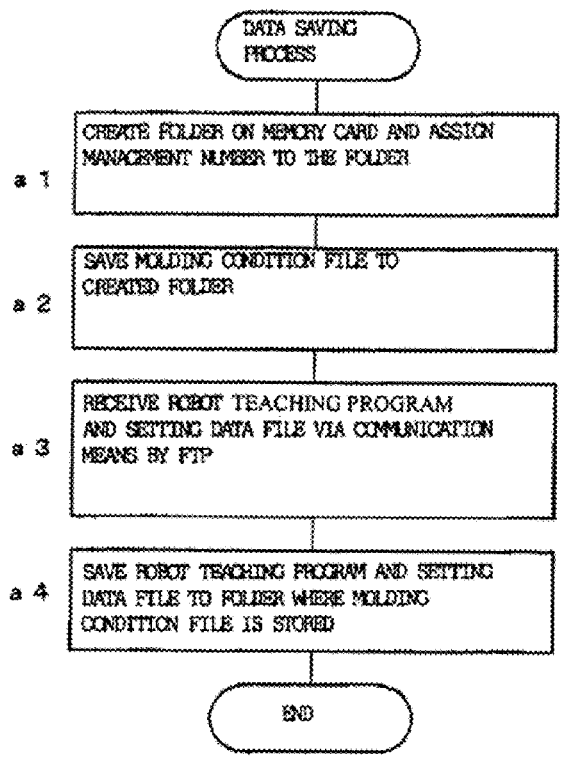

In case where a mold for which the set of molding conditions 1*a* and the robot teaching program and/or setting data 2*a* have already been stored in the memory card 3 is mounted in the injection molding machine, the processor in the controller 1 of the injection molding machine initiates the process shown in FIG. 3 when a molding condition read command is entered with a management number specified from the control panel on the controller 1 of the injection molding machine.

The processor accesses the molding condition file in the folder having a specified management number in the memory card 3 (step b1). Then the processor reads the stored robot teaching program and setting data file from the folder (step b2), and transfers this file to the controller 2 of the molded-product removing robot via Ethernet network 4 by means of FTP (step b3), thereby completing the data reading process.

As described above, when a set of molding conditions is read into the controller 1 of the injection molding machine, the program and/or setting data associated with the set of molding conditions is automatically read and set in the controller 2 of the molded-product removing robot. Thus the correspondence between the set of molding conditions 1*a* and the robot teaching program and/or setting data 2*a* is maintained, preventing incorrectly associated settings from being made.

In the above embodiment, a memory card 3 is used as a storage means for storing sets of molding conditions and their related robot teaching programs and/or setting data, but a floppy disk or any other external storage medium may be used instead. Furthermore, if the internal memory in the controller of the injection molding machine has sufficient capacity, the internal memory may be used as a storage means in place of the memory card.

In the above embodiment, when a command for saving or reading a set of molding conditions 1*a* and a robot teaching programs and/or setting data 2*a* is issued from the controller 1 of the injection molding machine, the processor in the controller 1 of the injection molding machine executes the data saving process shown in FIG. 2 or the data reading process shown in FIG. 3.

Alternatively, the processor in the controller 2 of the molded-product removing robot may execute a process equivalent to that shown in FIG. 2 or FIG. 3 when a command for saving or reading the robot teaching program and/or setting data 2*a* is issued from the controller 2 of the molded-product removing robot, storing a robot teaching program and setting data file and a molding condition file, associated with a folder assigned a management number, in an external storage medium such as a memory card or in the internal memory, and reading the robot teaching program and setting data file and their associated molding condition file from the folder. In this case, the program and setting data file and molding condition file are saved in the internal memory in the controller 2 of the molded-product removing robot or an external storage medium such as a memory card connected to the controller 2 of the molded-product removing robot.

Furthermore, a molding condition file and a robot teaching program and setting data file may be automatically saved to or read from the same folder on a data storage means provided either in the controller 1 of the injection molding machine or in the controller 2 of the molded-product removing robot whenever either a command for saving or reading the set of molding conditions 1*a* is entered from the control panel on the controller 1 of the injection molding machine or a command for saving or reading the robot teaching program and/or setting data 2*a* is entered from the control panel on the controller 2 of the molded-product removing robot.

The invention claimed is:

1. A data management method for an injection molding system in which a controller of an injection molding machine and a controller of a molded-product removing robot that removes a product molded by the injection molding machine are connected by a communication means, the method comprising:
   transferring, when an operation for saving a set of molding conditions is performed through an operation means on the injection molding machine side, a teaching program and/or setting data for the molded-product removing robot which correspond to the set of molding conditions, to the controller of the injection molding machine via the communication means, and
   saving the set of molding conditions for the injection molding machine and the teaching program and/or setting data for the molded-product removing robot in association with each other in a storage means.

2. A data management method for an injection molding system in which a controller of an injection molding machine and a controller of a molded-product removing robot that removes a product molded by the injection molding machine are connected by a communication means, the method comprising:
   storing a set of molding conditions for use in the injection molding machine and a teaching program and/or setting data for use in the molded-product removing robot in a storage means in association with each other,
   reading from the storage means, when an operation for reading the desired set of molding conditions is performed through an operation means on the injection molding machine, a desired set of molding conditions and a teaching program and/or setting data stored in association with the desired set of molding conditions, and
   setting the read teaching program and/or setting data in the controller of the molded-product removing robot via the communication means.

3. A data management method for an injection molding system in which a controller of an injection molding machine and a controller of a molded-product removing robot that removes a product molded by the injection molding machine are connected by a communication means, the method comprising:
   transferring, when an operation for saving the teaching program and/or setting data is performed through an operation means on the molded-product removing robot, a set of molding conditions for the injection molding machine which correspond to the teaching program and/or setting data, to the controller of the molded-product removing robot via the communication means, and saving the teaching program and/or setting data for the molded-product removing robot and the set of molding conditions for the injection molding machine in association with each other in a storage means.

4. A data management method for an injection molding system in which a controller of an injection molding machine and a controller of a molded-product removing robot that removes a product molded by the injection molding machine are connected by a communication means, the method comprising:

storing a teaching program and/or setting data for use in the molded-product removing robot and a set of molding conditions for use in the injection molding machine in association with each other in a storage means, reading from the storage means, when an operation for reading the desired teaching program and/or setting data is performed through an operation means on the molded-product removing robot, a desired teaching program and/or setting data and a set of molding conditions stored in association with the desired teaching program and/or setting data, and setting the read set of molding conditions in the controller of the injection molding machine via the communication means.

5. A data management method for an injection molding system in which a controller of an injection molding machine and a controller of a molded-product removing robot that removes a product molded by the injection molding machine are connected by a communication means, the method comprising:

providing the controller of the injection molding machine or the controller of the molded-product removing robot with a storage means for storing a set of molding conditions for use in the injection molding machine and a teaching program and/or setting data for use in the molded-product removing robot in association with each other, and transferring to the controller of the injection molding machine or the controller of the molded-product removing robot provided with said storage means from the controller not provided with the storage means via the communication means, when an operation for saving a set of molding conditions or an operation for saving a teaching program and/or setting data is performed through an operation means on the injection molding machine or an operation means on the molded-product removing robot, the set of molding conditions or the teaching program and/or setting data, and saving in the storage means the teaching program and/or setting data and the set of molding conditions in association with each other.

6. A data management method for an injection molding system in which a controller of an injection molding machine and a controller of a molded-product removing robot that removes a product molded by the injection molding machine are connected by a communication means, the method comprising:

providing the controller of the injection molding machine with a storage means for storing a set of molding conditions for use in the injection molding machine and a teaching program and/or setting data for use in the molded-product removing robot in association with each other, and reading, by the controller of the injection molding machine, when an operation for reading a set of molding conditions or an operation for reading a teaching program and/or setting data is performed through an operation means on the injection molding machine or an operation means on the molded-product removing robot, the set of molding conditions and its associated teaching program and/or setting data from said storage means, and setting the read molding conditions, and then transferring the teaching program and/or setting data for the molded-product removing robot to the controller of the molded-product removing robot via the communication means.

7. A data management method for an injection molding system in which a controller of an injection molding machine and a controller of a molded-product removing robot that removes a product molded by the injection molding machine are connected by a communication means, the method comprising:

providing the controller of the molded-product removing robot with a storage means for storing a set of molding conditions for use in the injection molding machine and a teaching program and/or setting data for use in the molded-product removing robot in association with each other, and reading, by the molded-product removing robot, when an operation for reading a set of molding conditions or an operation for reading a teaching program and/or selling data is performed through an operation means on the injection molding machine or an operation means on the molded-product removing robot, the set of molding conditions and its associated teaching program and/or selling data from the storage means, and selling the read program and/or setting data, and then transferring the set of molding conditions to the controller of the injection molding machine via the communication means.

8. The injection molding system data management method according to any one of claims 1, 2, 5, and 6, wherein the storage means is an internal memory in the controller of the injection molding machine.

9. The injection molding system data management method according to any one of claims 3, 4, 5, and 7, wherein the storage means is an internal memory in the controller of the molded-product removing robot.

10. The injection molding system data management method according to any one of claims 1 to 7, wherein the storage means is an external memory.

11. An injection molding system comprising:

a controller of an injection molding machine having an control panel, a controller of a molded-product removing robot, storage means provided to the controller of the injection molding machine, communication means for connecting the controller of the injection molding machine and controller of the molded-product removing robot, saving means for reading, in association with an operation for saving in said storage means a set of molding conditions stored in the controller of the injection molding machine through the operation of said control panel, a robot teaching program and/or setting data corresponding to the set of molding conditions, from the controller of the molded-product removing robot, and saving the read teaching program and/or selling data in said storage means via the communication means and the controller of the injection molding machine in association with the set of molding conditions, and reading means for reading, in association with an operation for reading from the storage means a set of molding conditions stored in the controller of the injection molding machine through the operation of said control panel, the robot teaching program and/or setting data corresponding to the set of molding conditions, and transferring the read robot teaching program and/or setting data to the controller of the molded-product removing robot.

* * * * *

UNITED STATES PATENT AND TRADEMARK OFFICE
CERTIFICATE OF CORRECTION

PATENT NO. : 7,328,083 B2
APPLICATION NO. : 11/325507
DATED : February 5, 2008
INVENTOR(S) : Yoshitaka Ikeda et al.

It is certified that error appears in the above-identified patent and that said Letters Patent is hereby corrected as shown below:

In the Drawings
Sheet 1 of 2 (Box a3), Fig. 2, Line 1, change "TEACHIONG" to --TEACHING--.
As shown in the attached page.

Column 8, Line 28, change "selling" to --setting--.

Column 8, Line 33, before "data" change "selling" to --setting--.

Column 8, Line 33, after "and" change "selling" to --setting--.

Column 8, Line 50, after "having" change "an" to --a--.

Column 8, Line 66, change "selling" to --setting--.

Signed and Sealed this

Twenty-ninth Day of July, 2008

JON W. DUDAS
*Director of the United States Patent and Trademark Office*